United States Patent
Wen et al.

(10) Patent No.: US 9,953,051 B2
(45) Date of Patent: Apr. 24, 2018

(54) MULTI-VERSION CONCURRENCY CONTROL METHOD IN DATABASE AND DATABASE SYSTEM

(71) Applicant: Huawei Technologies Co., Ltd., Shenzhen (CN)

(72) Inventors: Jijun Wen, Beijing (CN); Yuanyuan Nie, Beijing (CN); Jian Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/199,181

(22) Filed: Jun. 30, 2016

(65) Prior Publication Data

US 2016/0314161 A1    Oct. 27, 2016

Related U.S. Application Data

(63) Continuation of application No. PCT/CN2014/082794, filed on Jul. 23, 2014.

(30) Foreign Application Priority Data

Dec. 31, 2013 (CN) .......................... 2013 1 0750940

(51) Int. Cl.
*G06F 17/30* (2006.01)
*G06F 11/14* (2006.01)

(52) U.S. Cl.
CPC .... *G06F 17/30353* (2013.01); *G06F 11/1469* (2013.01); *G06F 17/30356* (2013.01); *G06F 17/30371* (2013.01); *G06F 2201/84* (2013.01)

(58) Field of Classification Search
None
See application file for complete search history.

(56) References Cited

U.S. PATENT DOCUMENTS

| 5,287,496 A | 2/1994 | Chen et al. |
| 6,125,368 A | 9/2000 | Bridge et al. |
| (Continued) | | |

FOREIGN PATENT DOCUMENTS

| CN | 1577334 A | 2/2005 |
| CN | 1842789 A | 10/2006 |
| (Continued) | | |

OTHER PUBLICATIONS

Partial English Translation and Abstract of Chinese Patent Application No. CN103744936, dated Jul. 21, 2016, 5 pages.

(Continued)

*Primary Examiner* — Amanda Willis
(74) *Attorney, Agent, or Firm* — Conley Rose, P.C.

(57) ABSTRACT

A multi-version concurrency control method in a database and a database system, where the database system sets a data page link of a page, where the data page link includes a page pointer, and a page pointer is used to point to another version page prior to a last operation on the version page. Hence, when a page in the database is read, and when a timestamp of a current version page is greater than a timestamp of a read transaction, page-level rollback may be directly performed according to a data page link of the page that is requested to read to roll back to a page that needs to be read, which facilitates queries for data on each version page in the database, and the database system may implement record rollback efficiently.

10 Claims, 9 Drawing Sheets

(56) References Cited

U.S. PATENT DOCUMENTS

| | | | |
|---|---|---|---|
| 7,395,278 | B2 | 7/2008 | Zwilling et al. |
| 2005/0216462 | A1 | 9/2005 | Xiao |
| 2007/0288529 | A1 | 12/2007 | Ganesh et al. |
| 2009/0177850 | A1 | 7/2009 | Boyd et al. |
| 2011/0153566 | A1* | 6/2011 | Larson ............. G06F 17/30356 707/638 |
| 2012/0233139 | A1* | 9/2012 | Larson ............. G06F 17/30545 707/703 |
| 2013/0346378 | A1* | 12/2013 | Tsirogiannis ......... G06F 12/023 707/693 |

FOREIGN PATENT DOCUMENTS

| | | |
|---|---|---|
| CN | 101477445 A | 7/2009 |
| CN | 102591993 A | 7/2012 |
| CN | 103744936 A | 4/2014 |
| EP | 0501180 A2 | 2/1992 |

OTHER PUBLICATIONS

Foreign Communication From a Counterpart Application, European Application No. 14876808.8, Extended European Search Report dated Dec. 22, 2016, 9 pages.

Foreign Communication From a Counterpart Application, Chinese Application No. 201310750940.8, Chinese Office Action dated Jun. 1, 2016, 6 pages.

Foreign Communication From a Counterpart Application, PCT Application No. PCT/CN2014/082794, English Translation of International Search Report dated Oct. 29, 2014, 2 pages.

Foreign Communication From a Counterpart Application, PCT Application No. PCT/CN2014/082794, English Translation of Written Opinion dated Oct. 29, 2014, 10 pages.

* cited by examiner

MULTI-VERSION CONCURRENCY CONTROL METHOD IN DATABASE AND DATABASE SYSTEM

CROSS-REFERENCE TO RELATED APPLICATIONS

This application is a continuation of International Application No. PCT/CN2014/082794, filed on Jul. 23, 2014, which claims priority to Chinese Patent Application No. 201310750940.8, filed on Dec. 31, 2013, both of which are hereby incorporated by reference in their entireties.

TECHNICAL FIELD

The present disclosure relates to the field of database technologies, and in particular, to a multi-version concurrency control (MVCC) method in a database and a database system.

BACKGROUND

MVCC is a locking mechanism widely used in a database system. This mechanism is used in current mainstream business database systems such as an Oracle database (a database developed by ORACLE), a structured query language server (SQL SERVER) database, and a PostgreSQL database.

Generally, a MVCC scheme includes two implementation types, one is a page-level multi-version type, and the other is a row-level multi-version type. The page-level multi-version indicates that a timestamp is recorded and modified on a page, and the page needs to be accessed according to the timestamp. If the timestamp does not meet a requirement, a proper page version needs to be constructed. In this way, a same page may correspond to a plurality of different versions in a database. The row-level multi-version indicates that a new version is generated whenever a record is updated. In this way, a read operation and a write operation on a same record may access different versions of the record such that reading and writing are not blocked.

During study and practice of the prior art, the inventor of the present disclosure discovers that, when a version page obtained is read, the page needs to be read according to information about all transactions on the page. If there are many transactions on the page, efficiency of reading the data page is not high, and the reading is inconvenient.

SUMMARY

Embodiments of the present disclosure provide a MVCC method in a database and a database system, which facilitates queries for data on each version page in the database.

A first aspect of the embodiments of the present disclosure provides a MVCC method in a database, including receiving a data reading request generated by a read transaction, where the data reading request is used to request to read a page in the database and the data reading request includes a timestamp of the read transaction, reading the current version page of the page that is requested to read by the data reading request if a timestamp of a current version page of the page that is requested to read by the data reading request is less than or equal to the timestamp of the read transaction, and performing page-level rollback using a page pointer of the current version page in a data page link of the page that is requested to read in order to roll back the current version page to a version page, a timestamp of which is less than or equal to the timestamp of the read transaction if the timestamp of the current version page is greater than the timestamp of the read transaction, where the data page link includes a page pointer of each version page of the page that is requested to read, and the page pointer of each version page is used to point to a previous version page of the version page.

In a first possible implementation manner of the first aspect of the embodiments of the present disclosure, the method further includes performing row-level rollback according to a record pointer of the one or more records included in a record link of the page that is requested to read in order to roll back the record in the operating state to a record prior to an operation if one or more records on the version page obtained after the page-level rollback are in an operating state at a moment indicated by the timestamp of the version page obtained after the page-level rollback, where the record link includes a record pointer of a record included in each version page of the page that is requested to read, and a record pointer of a record on a version page is used to point to a previous version record of the record.

With reference to the first aspect of the embodiments of the present disclosure or the first possible implementation manner of the first aspect, in a second possible implementation manner of the first aspect of the embodiments of the present disclosure, the method further includes receiving a data writing operation request generated by a write operation transaction, where the data writing operation request is used to request to perform a write operation on a page in the database and the data writing operation request includes a timestamp of the write operation transaction, reading a first version page of the page requested by the data writing operation request, and performing a write operation on the first version page according to the data writing operation request to obtain a second version page, where the first version page is a latest version page of the page that is requested by the data writing operation request and stored in the database before the write operation is performed, setting a timestamp of the second version page according to the timestamp of the write operation transaction, updating a transaction link in the database such that the transaction link includes an operation transaction pointer of the write operation transaction, where the transaction link includes a plurality of operation transaction pointers of a record on the page in the database, and each operation transaction pointer is used to point to a previous operation transaction on the record on the page in the database, and setting rollback information of the second version page, where the rollback information includes a page pointer and a record pointer.

With reference to the second possible implementation manner of the first aspect of the embodiments of the present disclosure, in a third possible implementation manner of the first aspect of the embodiments of the present disclosure, performing a write operation on the first version page according to the data writing operation request to obtain a second version page further includes inserting, on the first version page, the record that is requested to insert by the data writing operation request to obtain the second version page when the data writing operation request is a data writing operation request that requests to insert a record, and storing the first version page and the second version page. Setting rollback information of the second version page further includes setting a page pointer of the second version page such that the page pointer of the second version page is used to point to the first version page, and setting a record pointer of the second version page such that a record pointer of the inserted record on the second version page is used to point to a rollback record corresponding to the inserted record, where the rollback record includes information that the record that is requested to insert by the data writing operation request has been deleted from the first version page, and updating a transaction link of the database further includes setting a transaction identifier of the write operation transaction of inserting the record on the first version page, and setting an operation transaction pointer corresponding to the transaction identifier such that the operation transaction pointer is used to point to a transaction identifier of a previous operation of the write operation transaction of inserting the record on the first version page.

With reference to the second possible implementation manner of the first aspect of the embodiments of the present disclosure, in a fourth possible implementation manner of the first aspect of the embodiments of the present disclosure, performing a write operation on the first version page according to the data writing operation request to obtain a second version page further includes marking, on the first version page, the record that is requested to delete by the data writing operation request as deleted to obtain the second version page when the data writing operation request is a data writing operation request that requests to delete a record, and storing the first version page and the second version page. Setting rollback information of the second version page further includes setting a page pointer of the second version page such that the page pointer of the second version page is used to point to the first version page, and setting a record pointer of the second version page such that a record pointer of a record marked as deleted on the second version page is used to point to the record that is requested to delete by the data writing operation request from the first version page, and updating a transaction link of the database further includes setting a transaction identifier corresponding to the write operation transaction of deleting the record, and setting an operation transaction pointer corresponding to the transaction identifier such that the operation transaction pointer points to a transaction identifier of a previous operation of the write operation transaction of deleting the record.

With reference to the second possible implementation manner of the first aspect of the embodiments of the present disclosure, in a fifth possible implementation manner of the first aspect of the embodiments of the present disclosure, performing a write operation on the first version page according to the data writing operation request to obtain a second version page further includes updating the corresponding record on the first version page according to an indication of the data writing operation request to obtain the second version page when the data writing operation request is a data writing operation request that requests to update a record, and storing the first version page and the second version page, the setting a timestamp of the second version page according to the timestamp of the write operation transaction further includes setting the timestamp of the second version page to the timestamp of the write operation transaction. Setting rollback information of the second version page further includes setting a page pointer of the second version page such that the page pointer of the second version page is used to point to the first version page, and setting a record pointer of the second version page such that a record pointer of an updated record on the second version page is used to point to the record prior to the update on the first version page, and updating a transaction link of the database further includes setting a transaction identifier corresponding to the write operation transaction of updating the record, and setting an operation transaction pointer corresponding to the transaction identifier such that the operation transaction pointer is used to point to a transaction identifier of a previous operation of the write operation transaction of updating the record.

With reference to any one possible implementation manner of the second possible implementation manner to the fifth possible implementation manner of the first aspect of the embodiments of the present disclosure, in a sixth possible implementation manner of the first aspect of the embodiments of the present disclosure, setting a timestamp of the second version page according to the timestamp of the write operation transaction further includes using the timestamp of the first version page as the timestamp of the second version page if a timestamp of the first version page is greater than the timestamp of the write operation transaction, and setting the timestamp of the second version page to the timestamp of the write operation transaction if the timestamp of the first version page is less than the timestamp of the write operation transaction.

A second aspect of the embodiments of the present disclosure provides a database system, including a read receiving unit configured to receive a data reading request generated by a read transaction, where the data reading request is used to request to read a page in the database and the data reading request includes a timestamp of the read transaction, a reading unit configured to read the current version page of the page that is requested to read by the data reading request if a timestamp of a current version page of the page that is requested to read by the data reading request received by the read receiving unit is less than or equal to the timestamp of the read transaction, and a page-level rollback unit configured to perform page-level rollback using a page pointer of the current version page in a data page link of the page that is requested to read in order to roll back the current version page to a version page, a timestamp of which is less than or equal to the timestamp of the read transaction if the timestamp of the current version page is greater than the timestamp of the read transaction, where the data page link includes a page pointer of each version page of the page that is requested to read, and the page pointer of each version page is used to point to a previous version page of the version page.

In a first possible implementation manner of the second aspect of the embodiments of the present disclosure, the database system further includes a row-level rollback unit configured to perform row-level rollback according to a record pointer of the one or more records included in a record link of the page that is requested to read in order to roll back the record in the operating state to a record prior to an operation if one or more records on the version page obtained after the page-level rollback unit performs the page-level rollback are in an operating state at a moment indicated by the timestamp of the version page obtained after the page-level rollback, where the record link includes a record pointer of a record included in each version page of the page that is requested to read, and a record pointer of a record on a version page is used to point to a previous version record of the record.

With reference to the second aspect of the embodiments of the present disclosure or the first possible implementation manner of the second aspect, in a second possible implementation manner of the second aspect of the embodiments of the present disclosure, the database system further includes a write operation receiving unit configured to receive a data writing operation request generated by a write operation transaction, where the data writing operation request is used to request to perform a write operation on a page in the database and the data writing operation request includes a timestamp of the write operation transaction, a write operation unit configured to read a first version page corresponding to the data writing operation request, and perform the write operation on the first version page according to the data writing operation request to obtain a second version page, where the first version page is a latest version page of the page that is requested by the data writing operation request and stored in the database before the write operation is performed, a timestamp setting unit configured to set a timestamp of the second version page according to the timestamp of the write operation transaction, and a rollback setting unit configured to update a transaction link in the database such that the transaction link includes an operation transaction pointer of the write operation transaction, where the transaction link includes a plurality of operation transaction pointers of a record on the page in the database, and each operation transaction pointer is used to point to a previous operation transaction on the record on the page in the database, and set rollback information of the second version page, where the rollback information includes a page pointer and a record pointer.

With reference to the second possible implementation manner of the second aspect of the embodiments of the present disclosure, in a third possible implementation manner of the second aspect of the embodiments of the present disclosure the write operation unit is further configured to insert, on the first version page, the record that is requested to insert by the data writing operation request to obtain the second version page when the data writing operation request received by the write operation receiving unit is a data writing operation request that requests to insert a record on the first version page, and store the first version page and the second version page, and the rollback setting unit further includes a data page link setting unit configured to set a page pointer of the second version page such that the page pointer of the second version page is used to point to the first version page, a record link setting unit configured to set a record pointer of the second version page such that a record pointer of the inserted record on the second version page is used to point to a rollback record corresponding to the inserted record, where the rollback record includes information that the record that is requested to insert by the data writing operation request has been deleted from the first version page, and a transaction link setting unit configured to set a transaction identifier corresponding to the write operation transaction of inserting the record on the first version page, and set an operation transaction pointer corresponding to the transaction identifier such that the operation transaction pointer is used to point to a transaction identifier of a previous operation of the write operation transaction of inserting the record on the first version page.

With reference to the second possible implementation manner of the second aspect of the embodiments of the present disclosure, in a fourth possible implementation manner of the second aspect of the embodiments of the present disclosure the write operation unit is further configured to mark, on the first version page, the record that is requested to delete by the data writing operation request as deleted to obtain the second version page when the data writing operation request received by the write operation receiving unit is a data writing operation request that requests to delete a record from the first version page, and store the first version page and the second version page, and the data page link setting unit is further configured to set a page pointer of the second version page such that the page pointer of the second version page is used to point to the first version page. The record link setting unit is further configured to set a record pointer of the second version page such that a record pointer of a record marked as deleted on the second version page is used to point to the record that is requested to delete by the data writing operation request from the first version page, and the transaction link setting unit is further configured to set a transaction identifier corresponding to the write operation transaction of deleting the record, and set an operation transaction pointer corresponding to the transaction identifier such that the operation transaction pointer is used to point to a transaction identifier of a previous operation of the write operation transaction of deleting the record.

With reference to the second possible implementation manner of the second aspect of the embodiments of the present disclosure, in a fifth possible implementation manner of the second aspect of the embodiments of the present disclosure the write operation unit is further configured to update the corresponding record on the first version page according to an indication of the data writing operation request to obtain the second version page when the data writing operation request received by the write operation receiving unit is a data writing operation request that requests to update a record on the first version page, and store the first version page and the second version page, and the data page link setting unit is further configured to set a page pointer of the second version page such that the page pointer of the second version page is used to point to the first version page, the record link setting unit is further configured to set a record pointer of the second version page such that a record pointer of an updated record on the second version page is used to point to the record prior to the update on the first version page, and the transaction link setting unit is further configured to set a transaction identifier corresponding to the write operation transaction of updating the record, and set an operation transaction pointer corresponding to the transaction identifier such that the operation transaction pointer is used to point to a transaction identifier of a previous operation of the write operation transaction of updating the record.

With reference to any one possible implementation manner of the second possible implementation manner to the fifth possible implementation manner of the second aspect of the embodiments of the present disclosure, in a sixth possible implementation manner of the second aspect of the embodiments of the present disclosure the timestamp setting unit is further configured to use the timestamp of the first version page as the timestamp of the second version page if a timestamp of the first version page is greater than the timestamp of the write operation transaction, and set the timestamp of the second version page to the timestamp of the write operation transaction if the timestamp of the first version page is less than the timestamp of the write operation transaction.

In the embodiments, a database system sets a data page link of a page, where the data page link includes a page pointer of each version page of the page, and a page pointer of a version page is used to point to another version page prior to a last operation on the version page, that is, a previous version page. In this way, when a page in the database is read, if a timestamp of a current version page is greater than a timestamp of a corresponding read transaction included in a data reading request, page-level rollback may be performed directly according to a data page link of the page that is requested to read to roll back to a version page that needs to be read, which helps a user to know a page in the database at any time, that is, which facilitates queries for data on each version page in the database. In addition, the database system may further roll back, in combination with a record link, a record in an operating state on a version page obtained after the page-level rollback to a record prior to modification such that the record rollback can be implemented efficiently by combining the data page link and the record link, thereby realizing consistent reading.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person skilled in the art based on the embodiments of the present disclosure without creative efforts shall fall within the protection scope of the present disclosure.

Figure 1:
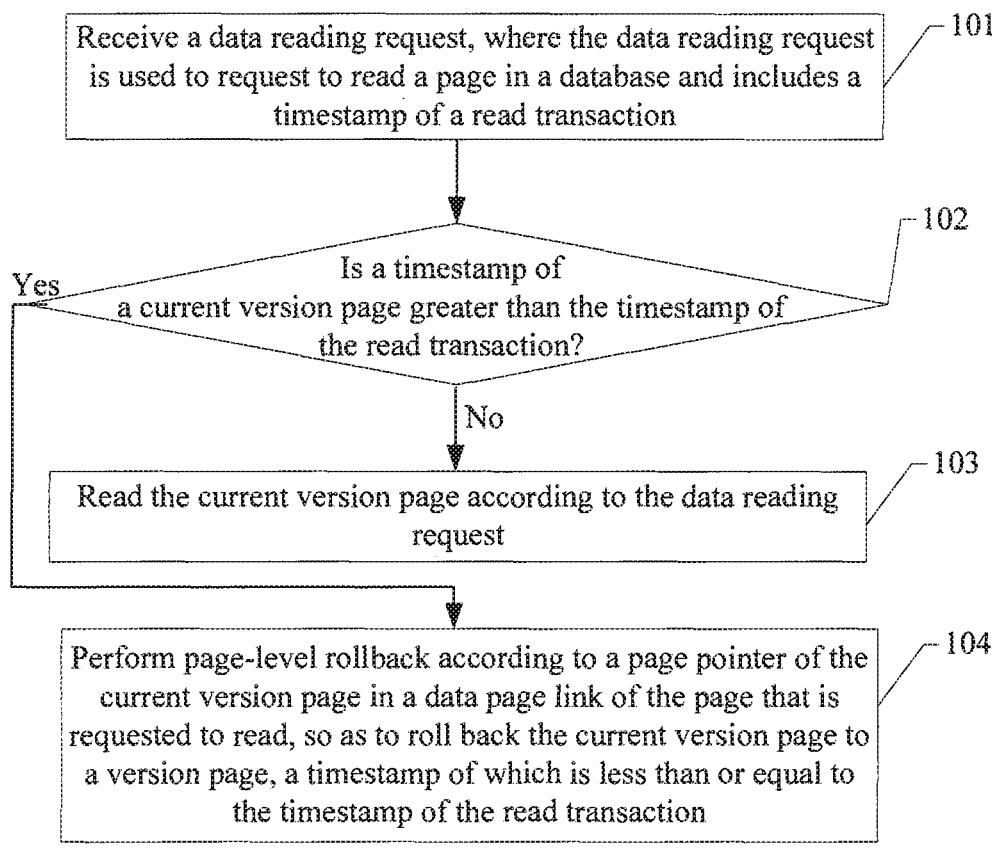
FIG. 1 is a flowchart of a MVCC method in a database according to an embodiment of the present disclosure.

An embodiment of the present disclosure provides a MVCC method in a database, where the method is mainly executed by a database system, for example, a distributed magnetic disk database system, a cluster database system, or a massively parallel processing (MPP) database system. A flowchart is shown in FIG. 1, including the following steps.

Step 101: Receive a data reading request generated by a read transaction, where the data reading request is used to request to read a page in a database and the data reading request includes a timestamp of the read transaction.

It may be understood that the database system provides a user interface such that a user can trigger, on the user interface, a write operation (for example, deleting, inserting or updating a record in the database) on data in the database or trigger a process of reading data in the database. If the user sends a data reading process on the user interface, the database system performs step 102 to step 104 after receiving a data reading request on the user interface.

The data reading request may include a timestamp of a read transaction, and may further include information such as an identifier of a page that needs to be read. An operation that the user performs on the data in the database is called a transaction. In this embodiment, the operation is a read operation, and therefore the corresponding transaction is a read transaction. Each time after the user performs a write operation on the database and commits the operation to the database system for storage, the database system stores corresponding information about the write operation accordingly, for example, a system control number (SCN) and a timestamp used to uniquely identify an operation, where the timestamp may be further represented by a system logical timestamp (SLT).

Step 102: Determine whether a timestamp of a current version page of a page that is requested to read by the data reading request is greater than the timestamp of the read transaction, if yes, it indicates that the page that needs to be read by a user is not a version page obtained after the user performs a latest write operation, and perform step 104, it may be understood that if the timestamp of the current version page of the page that is requested to read by the data reading request is less than or equal to the timestamp of the read transaction, perform step 103.

Step 103: Read a current version page of the page that is requested to read by the foregoing data reading request.

When the user performs the write operation on the data in the database, the user may perform multiple write operations on a page, and after each write operation is performed, the database system stores a version page obtained prior to the write operation and a version page obtained after the write operation. In addition, the database system may further set corresponding rollback information for each version page, which facilitates subsequent queries and rollback of the database by the user. The rollback herein refers to retrieving information before the user performs one or multiple write operations on the page. In this step, the current version page read refers to a version page obtained after the user performs the latest write operation on the page and stored in the database after the latest write operation.

The rollback information of a version page may include a page pointer, a record pointer, and the like, where a page pointer of a version page is used to point to another version page prior to a last operation on the version page, that is, a previous version page, and page pointers of all version pages of a page may be collected to form a data page link of the page. A record pointer that is of a record and included in a version page is used to point to another version record prior to a last operation on the record, that is, a previous version record, and record pointers of records included in all version pages of a page may be collected to form a record link of the page. It should be noted that when data is stored in the database, the data is stored by page, a data page may include multiple rows of data, and each row of data is stored according to a rule. In this case, a row of data may be called a record.

Step 104: Perform page-level rollback according to a page pointer of the foregoing current version page in a data page link of the page that is requested to read by the foregoing data reading request, so as to roll back the current version page to a version page, a timestamp of which is less than or equal to the timestamp of the read transaction, where the data page link includes a page pointer of each version page of the page that is requested to read. Further, the database system may roll back to a previous version page first according to the page pointer of the current version page. If a timestamp of the previous version page is still greater than the timestamp of the foregoing read transaction, the database system further performs page-level rollback according to the page pointer of the previous version page. The database system performs the operation in a cyclic manner until it rolls back to a version page, a timestamp of which is less than or equal to the timestamp of the read transaction. The page pointer of the current version page herein is used to point to another version page prior to a last operation on the current version page, that is, a previous version page, and the page-level rollback refers to retrieving, by page, information before the user performs one or multiple write operations on the page.

Figure 2:
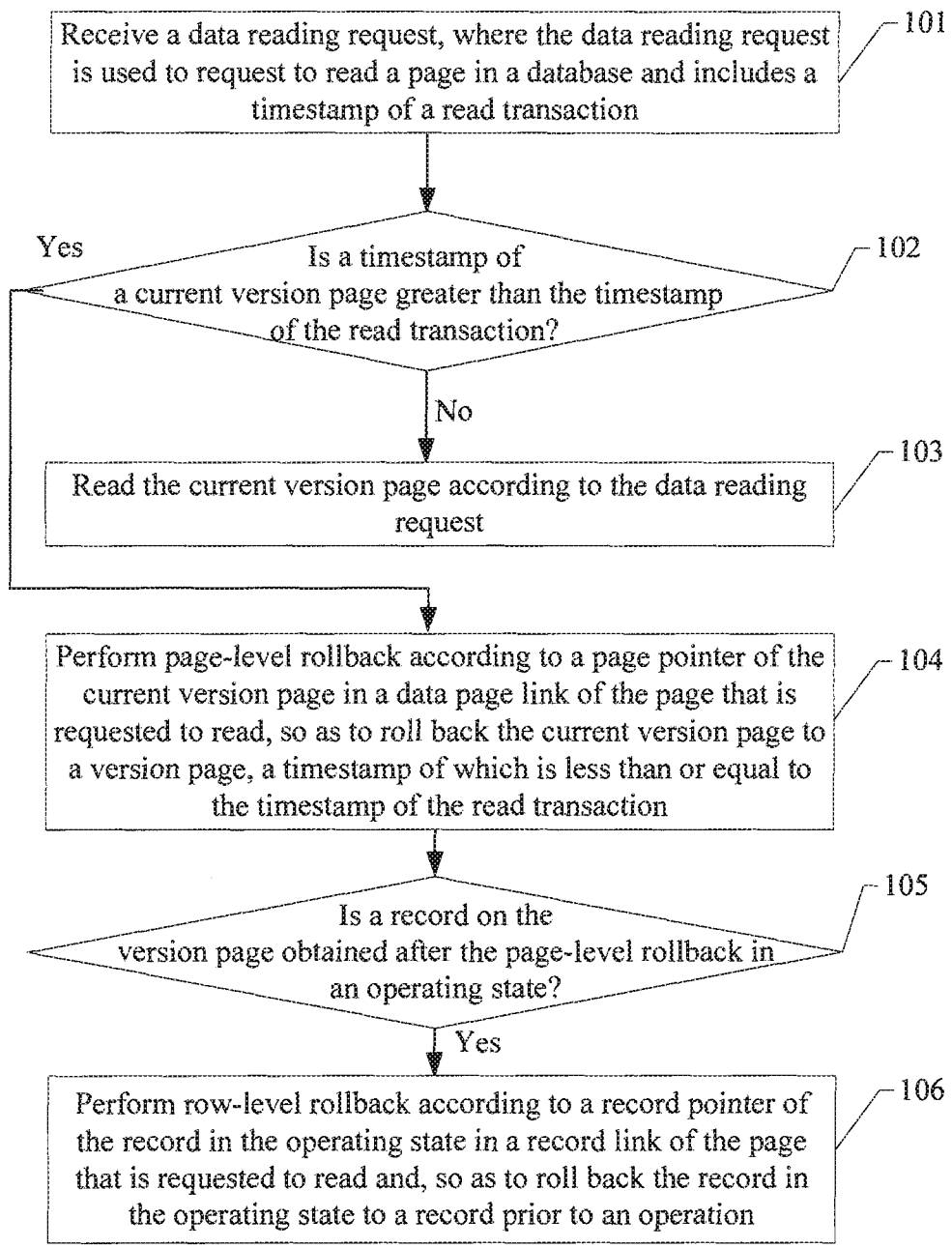
FIG. 2 is a flowchart of another MVCC method in a database according to an embodiment of the present disclosure.

It should be noted that the database system obtains a version page corresponding to the data reading request after performing the foregoing step 104. If all records on the version page are in a non-operating state at that time, that is, the records are not operated by the database system at that time, the process ends. However, if some records on the version page are in an operating state at that time, the database system further needs to perform row-level rollback. The row-level rollback herein refers to retrieving, by row of data on the page, information before the user performs one or multiple write operations on one row or several rows of data. Further, the database system may perform the following steps. A flowchart is shown in FIG. 2.

Step 105: Determine whether one or more records on the version page obtained after the page-level rollback are in an operating state at a moment indicated by the timestamp of the version page obtained after the page-level rollback, that is, whether the records are being operated by the database system. If the records are in the operating state, perform step 106, if the records are in a non-operating state, use the version page obtained after the page-level rollback as a final result of the foregoing data reading request.

The version page obtained after the page-level rollback correspondingly has a timestamp and rollback information. In this embodiment, the database system traverses all records on the version page to determine whether a record is in the operating state. If a record on the version page obtained after the page-level rollback includes a transaction identifier of a write operation transaction performed on the record, it indicates that the database system is performing the write operation on some records on the version page obtained after the page-level rollback at that time, and the records are in the operating state.

Step 106: Perform row-level rollback according to a record pointer of the foregoing records (one or more records) in a record link of a record on the page that is requested to read by the foregoing data reading request, and roll back the records in the operating state to records prior to an operation, where the record link includes a record pointer of a record included in each version page of the page that is requested to read. A record of the row-level rollback record herein is similar to a record of the foregoing page-level rollback. A difference is that the row-level rollback in this step does not require timestamp comparison.

In addition, it should be noted that after the database system performs the operation of reading the current version page in the foregoing step 103, the database system may further perform an operation, which is similar to the foregoing step 105 and step 106, on the current version page. That is, if some records on the current version page are in the operating state, the database system needs to perform the row-level rollback on the records, to roll back the records in the operating state to records prior to an operation, which is not further described herein.

It can be seen that in this embodiment, a database system sets a data page link of a page, where the data page link includes a page pointer of each version page of the page, and a page pointer of a version page is used to point to another version page prior to a last operation on the version page, that is, a previous version page. In this way, when a page in the database is read, if a timestamp of a current version page is greater than a timestamp of a corresponding read transaction included in a data reading request, page-level rollback may be performed directly according to a data page link of the page that is requested to read to roll back to a version page that needs to be read, which helps a user to know a page in the database at any time, that is, which facilitates queries for data on each version page in the database. In addition, the database system may roll back, in combination with a record link, a record in an operating state on a version page obtained after the page-level rollback to a record prior to modification such that the record rollback can be implemented efficiently by combining the data page link and the record link, thereby realizing consistent reading.

Figure 3:
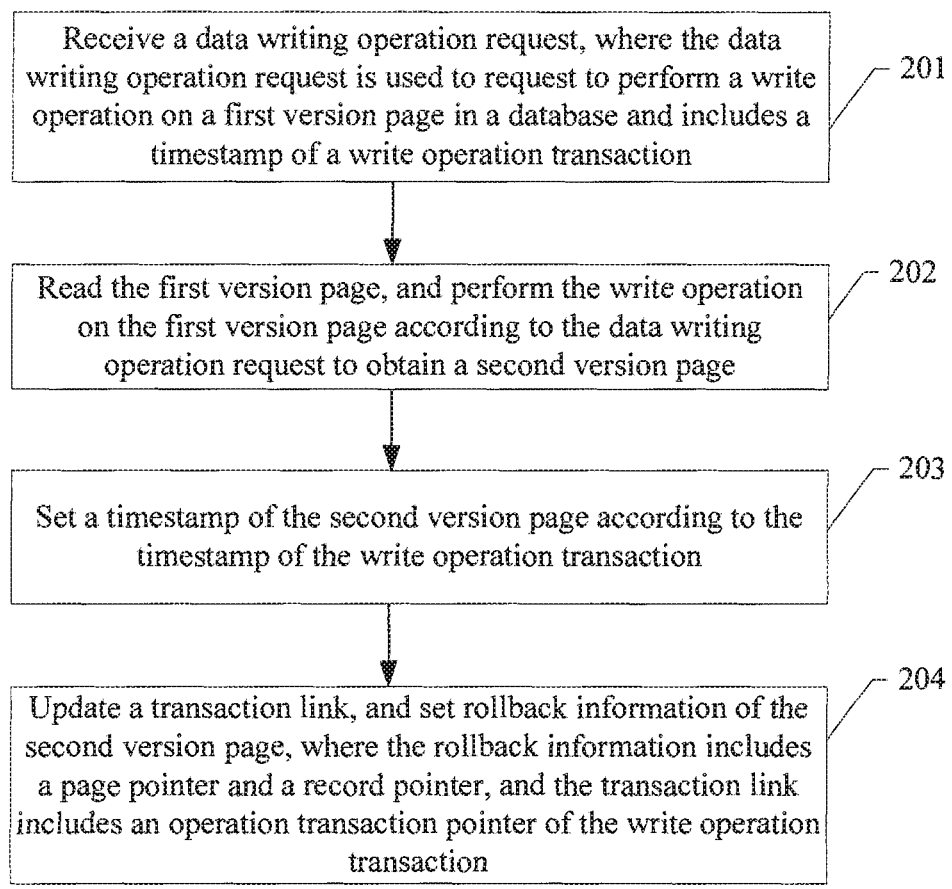
FIG. 3 is a flowchart of another MVCC method in a database according to an embodiment of the present disclosure.

The foregoing steps 101 to 106 describe an operation process of reading the data in the database by the database system. During a specific implementation, the database system may perform a write operation on the data in the database according to the following steps. A flowchart is shown in FIG. 3.

Step 201: Receive a data writing operation request generated by a write operation transaction, where the data writing operation request is used to request to perform a write operation on a page in a database and the data writing operation request includes a timestamp of the write operation transaction, and the write operation herein may include an operation of inserting a record, deleting a record or updating a record.

Step 202: Read a first version page of the page requested by the data writing operation request, and perform the write operation on the first version page according to the data writing operation request to obtain a second version page, where the first version page is a latest version page of the page that is requested by the data writing operation request and stored in the database before the foregoing write operation is performed, and the second version page is a latest version page of the page that is requested by the data writing operation request and stored in the database after the foregoing write operation is performed.

It may be understood that when a user initiates, on a user interface provided by the database system, a data writing operation request to the database, and when the database system receives the data writing operation request on the user interface, the database system reads a corresponding first version page first, and then performs a write operation on the first version page.

Step 203: Set a timestamp of the second version page according to the timestamp of the write operation transaction. Furthermore, if a timestamp of the first version page is greater than the timestamp of the write operation transaction, it indicates that another user performs a write operation on the page, which results in the larger timestamp of the first version page, and the database system needs to continue performing the operation on the first version page. In this case, the timestamp of the first version page is not modified, but the timestamp of the first version page is used as the timestamp of the second version page. If the timestamp of the first version page is less than or equal to the timestamp of the operation transaction, the timestamp of the second version page is directly set to the timestamp of the operation transaction.

Step 204: Set rollback information of the second version page, where the rollback information includes a page pointer and a record pointer. Update a transaction link in the database such that the transaction link includes an operation transaction pointer of the foregoing write operation transaction, where the transaction link includes a plurality of operation transaction pointers of a record on the page in the database, each operation transaction pointer is used to point to a previous operation transaction on the record on the page in the database, and one operation transaction may be used to operate at least one record on a page, and may also be used to operate a record on multiple pages.

In this embodiment, the write operation may further include the following several manners.

(1) If the writing operation request is a writing operation request that requests to insert a record on the first version page, when the database system performs step 202, the database system inserts, on the first version page, the record that is requested to insert by the data writing operation request to obtain the second version page, and stores the first version page and the second version page.

When performing step 204, the database system sets a page pointer of the second version page such that the page pointer of the second version page is used to point to the first version page, and sets a record pointer of the second version page such that a record pointer of the inserted record on the second version page is used to point to a rollback record corresponding to the inserted record, when updating the transaction link in the database, the database system mainly sets a transaction identifier of the write operation transaction of inserting the record on the first version page, and sets an operation transaction pointer corresponding to the transaction identifier such that the operation transaction pointer is used to point to a transaction identifier of a previous operation of the write operation transaction of inserting the record on the first version page. The rollback record corresponding to the inserted record is recorded in the database system, which may further include information that the record that is requested to insert by the data reading request has been deleted from the first version page.

(2) If the data writing operation request is a data writing operation request that requests to delete a record from the first version page, when the database system performs step 202, the database system marks, on the first version page, the record that is requested to delete by the data writing operation request as deleted to obtain the second version page, and stores the first version page and the second version page.

When performing step 204, the database system sets a page pointer of the second version page such that the page pointer of the second version page is used to point to the first version page, and sets a record pointer of the second version page such that a record pointer of a record marked as deleted on the second version page is used to point to the record that is requested to delete by the data writing operation request from the first version page. When updating the transaction link in the database, the database system sets a transaction identifier corresponding the write operation transaction of deleting the record, and sets an operation transaction pointer corresponding to the transaction identifier such that the operation transaction pointer is used to point to a transaction identifier of a previous operation of the write operation transaction of deleting the record.

(3) If the data writing operation request is a data writing operation request that requests to update a record on the first version page, when the database system performs step 202, the database system updates the corresponding record on the first version page according to an indication of the data writing operation request to obtain the second version page, and stores the first version page and the second version page.

When performing step 204, the database system sets a page pointer of the second version page such that the page pointer of the second version page is used to point to the first version page, and sets a record pointer of the second version page such that a record pointer of an updated record on the second version page is used to point to a record prior to the update on the first version page. When updating the transaction link in the database, the database system may set a transaction identifier corresponding to the write operation transaction of updating the record, and sets an operation transaction pointer corresponding to the transaction identifier such that the operation transaction pointer is used to point to a transaction identifier of a previous operation of the write operation transaction of updating the record.

It should be noted that the foregoing first version page and second version page do not indicate a sequential relationship, but are used to describe pages of different versions. In addition, the foregoing steps 203 and 204 do not have an absolute sequential relationship, may be performed concurrently, and may also be performed in a sequence. FIG. 3 illustrates only a specific implementation method.

In addition, it should be noted that in the embodiment of the present disclosure, the database system further records a transaction link such that transaction rollback may be performed, that is, an operation of the user is rolled back to a state prior to the operation. Because an operation may correspond to at least one record on at least one page, that is, a transaction identifier may be associated with an operation on at least one record one at least one page, the transaction link may include an operation transaction pointer of a record on a page in the database, where an operation transaction pointer of one transaction identifier is used to point to an operation transaction of another transaction identifier.

The following describes an MVCC method in a database according to the present disclosure using a specific embodiment. In this embodiment, rollback information corresponding to a version page may include a page pointer and a record pointer, and a database system further stores a transaction link, where the transaction link includes an operation transaction pointer, and all old version pages of a page are stored in a corresponding rollback segment. The database system performs an operation on the database mainly in the following several manners.

(1) Read a page a in the database, where multiple old version pages of the page a are stored in a rollback segment 1 of the database system.

Figure 4:
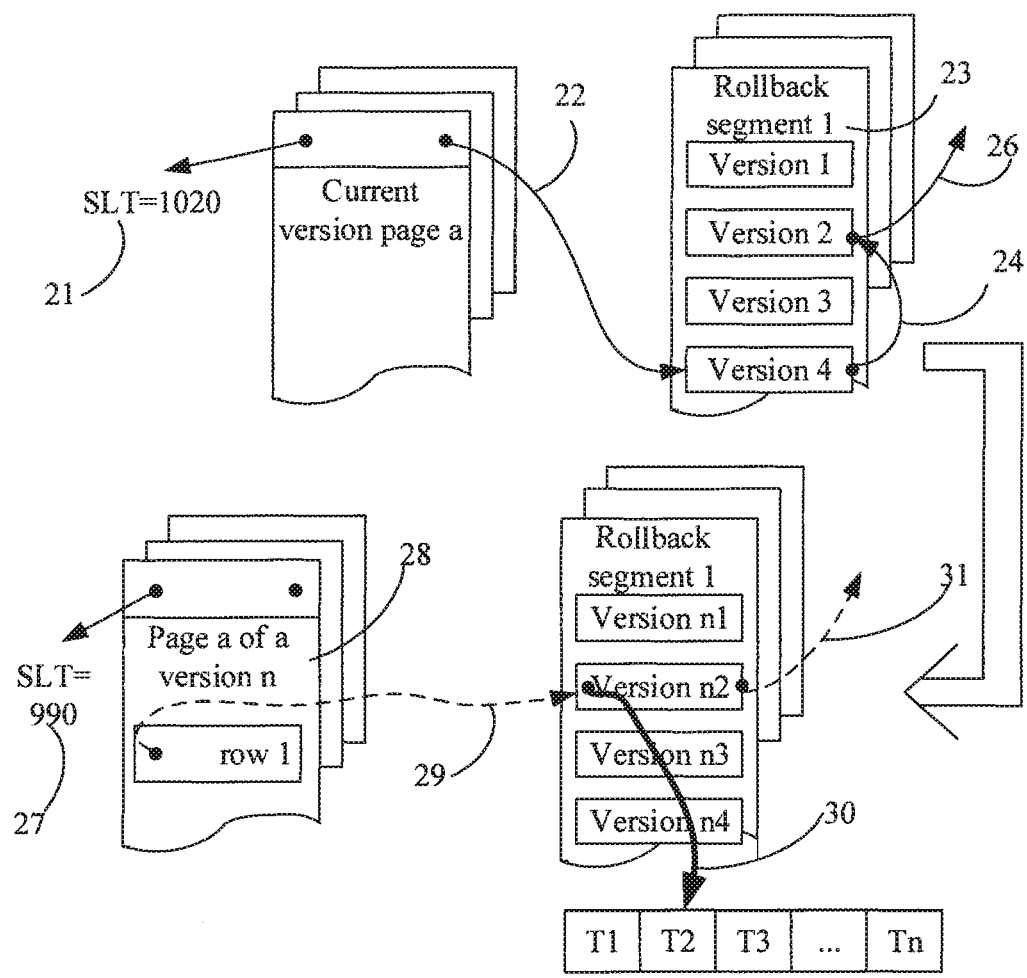
FIG. 4 is a schematic diagram of reading a page by a database system according to an embodiment of the present disclosure.

As shown in FIG. 4, square frames overlapped after a page represent multiple pages, and square frames overlapped after a rollback segment represent rollback segments corresponding to the multiple pages. In this embodiment, the database system receives a data reading request, where the data reading request is used to request to read the page a, and includes a read transaction, an SLT of which is 1001. In this way, the database system compares the SLT of the read transaction with an SLT=1020(21) (1020) of a current version page a, and finds that the SLT of the read transaction is less than the SLT (21) of the current version page a. In this case, a page-level rollback operation needs to be performed first.

When performing the page-level rollback, the database system finds, along a page pointer (22) set at a page header of the current version page a and in the rollback segment 1(23) corresponding to the current version page a, another version page prior to a last operation on the current version page a, that is, a version 4. Then, the database system rolls back, along a page pointer (24) set at a page header of the version 4, to the page a of a version 2. The database system performs the operation in a cyclic manner until it rolls back to a version page corresponding to an SLT that is equal to or slightly less than the SLT of the read transaction. In this embodiment, the database system rolls back to the page a of a version n (28), an SLT of which (27) is 990. In FIG. 4, a relatively thin solid-line arrow (22, 24 or 26) is used to represent a data page link.

The database system traverses each record on the page a of the version n (28), and finds that at a time point corresponding to the SLT 990, the 1st row (row 1 of record is in an operating state, that is, it is being operated by the database system, and a transaction identifier is T2. In this case, the database system needs to perform row-level rollback according to a record pointer (29) corresponding to the 1 st row, and rolls back to a record in a version n2 of the page a. Then, the database system performs row-level rollback according to a record pointer (31) of the record in the version n2 until it rolls back to a record prior to an operation, a transaction identifier of which is T2. In FIG. 4, a relatively thick solid-line arrow (30) is used to represent a transaction link, and a dashed-line arrow (29 or 31) is used to represent a record link.

(2) Perform a write operation of inserting a record 1 on a page b, where multiple old version pages of the page b are stored in a rollback segment 2 of the database system.

Figure 5:
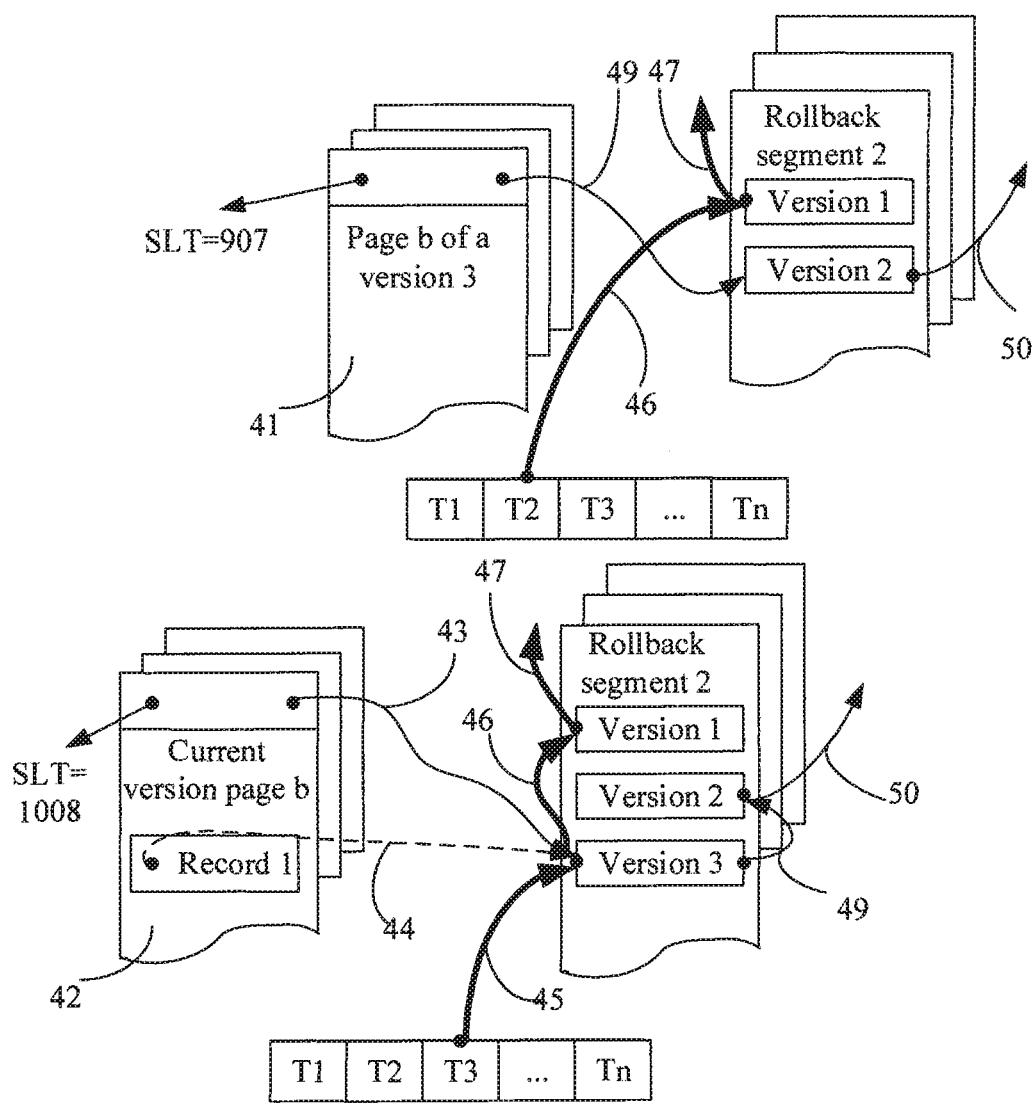
FIG. 5 is a schematic diagram of inserting a record on a page by a database system according to an embodiment of the present disclosure.

As shown in FIG. 5, square frames overlapped after a page represent multiple pages, and square frames overlapped after a rollback segment represent rollback segments corresponding to the multiple pages. A data writing operation request received by the database system is a write operation of inserting the record 1 on the page b and the operation request includes a write operation transaction, an SLT of which is 1008.

Before the operation is performed on the page b according to the data writing operation request, a current version of the page b stored in the database system is a version 3 (41), and a data page link of the page b includes the page b of the version 3→the page b of a version 2 in the corresponding rollback segment 2→the page b of another version (49 and 50).

Before the operation is performed on the page b according to the data writing operation request, the database system first inserts the record 1 on the page b of the version 3 to form the current version page b (42), and then stores the current version page b, and stores the page b of the version 3 (41) in the rollback segment 2. The database system sets an SLT of the current version page b to the SLT of the write operation transaction, that is, 1008. The database system sets a page pointer (43) of the current version page b such that the page pointer of the current version page b is used to point to the page b of the version 3. In this case, the data page link of the page b includes the current version page b→the page b of the version 3→the page b of the version 2→the page b of another version (43, 49 and 50). The database system sets a record pointer (44) of the record 1 on the current version page b such that the record pointer (44) of the record 1 on the current version page b is used to point to a rollback record corresponding to the record 1 inserted into the rollback segment 2, where the rollback record includes information that the inserted record 1 is deleted from the page b of the version 3. When updating a transaction link, the database system may set a transaction identifier of the inserted record 1 to T3, and set an operation transaction pointer of the transaction identifier T3 (45) such that the operation transaction pointer of the T3 is used to point to a transaction identifier T2 of a previous operation (that is, an operation on the page b of a version 1, or the like).

In FIG. 5, a relatively thin sold-line arrow (43, 49 or 50) is used to represent a data page link, a relatively thick sold-line arrow (45, 46 or 47) is used to represent a transaction link, and a dashed-line arrow (44) is used to represent a record link.

(3) Perform a write operation of deleting a record 2 from a page c, where multiple old version pages of the page c are stored in a rollback segment 3 of the database system.

Figure 6:
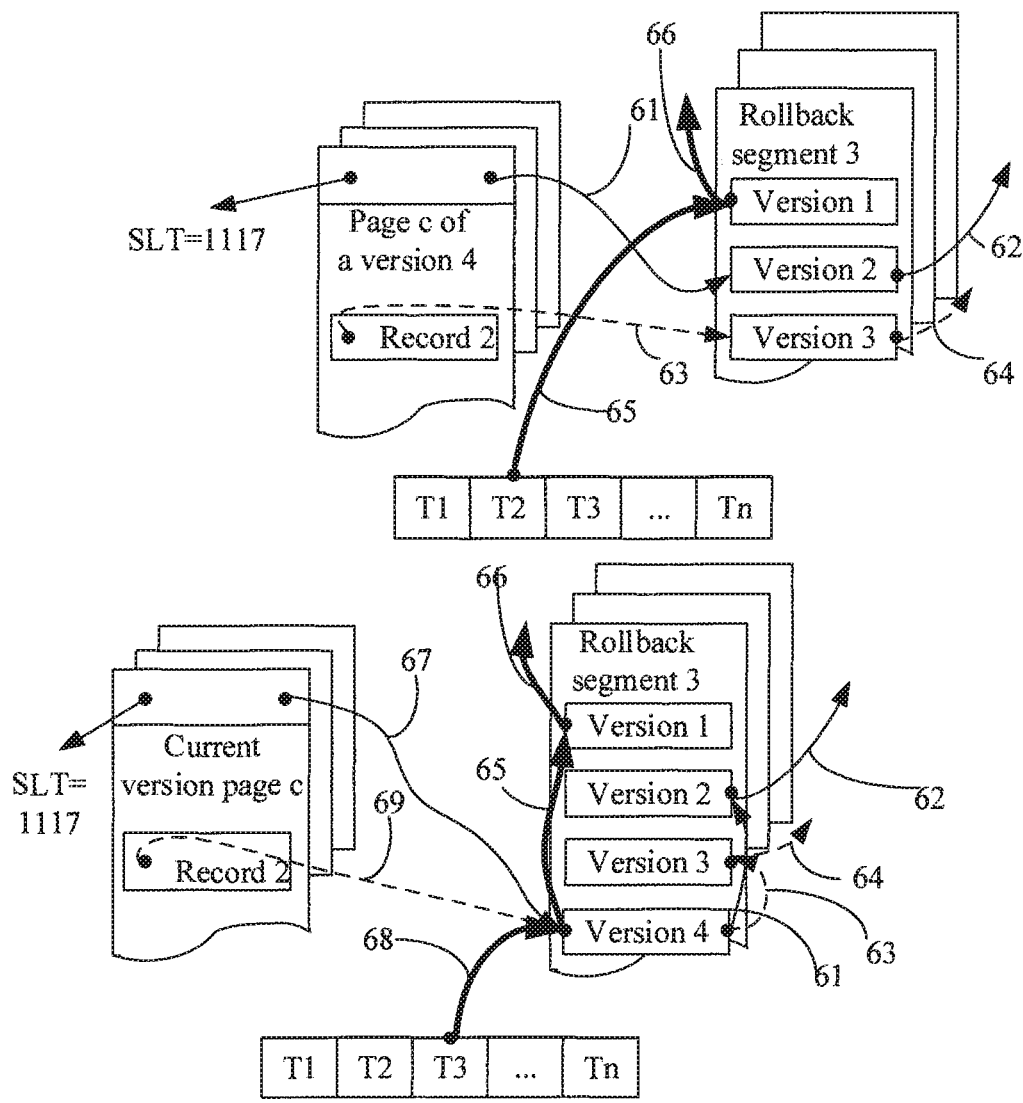
FIG. 6 is a schematic diagram of deleting a record from a page by a database system according to an embodiment of the present disclosure.

As shown in FIG. 6, square frames overlapped after a page represent multiple pages, and square frames overlapped after a rollback segment represent rollback segments corresponding to the multiple pages. A data writing operation request received by the database system is a data write operation request of deleting the record 2 inserted on the page c and the operation request includes a write operation transaction, an SLT of which is 1117.

Before the operation is performed on the page c according to the data writing operation request, a current version of the page c stored in the database system is a version 4, and a data page link of the page c of the version 4 includes the page c of the version 4→the page c of a version 2 in the corresponding rollback segment 3→the page c of another version (61 and 62). A record link of the record 2 on the page c of the version 4 includes the record 2 on the page c of the version 4→a record on the page c of the version 3→a record on the page c of another version (63 and 64).

When the operation is performed on the page c according to the data writing operation request, the database system first marks a record header of the record 2 on the page c of the version 4 as deleted to form the current version page c, and then stores the current version page c and stores the page c of the version 4 in the rollback segment 3. Because an SLT (1117) of the page c of the version 4 is greater than the SLT of the write operation transaction, the database system directly uses the SLT of the page c of the version 4 as the SLT of the current version c. The database system sets a page pointer (67) of the current version page c such that the page pointer of the current version page c is used to point to the page c of the version 4. In this case, the data page link of the page c includes the current version page c→the page c of the version 4→the page c of the version 2→the page c of another version (67, 61 and 62). The database system sets a record pointer (69) of the record 2 on the current version page c such that the record pointer of the record 2 marked as deleted on the current version page c is used to point to the record on the page c of the version 4. In this case, the record link of the record 2 on the page c includes the record 2 marked as deleted on the current version page c→a record on the page c of the version 4→a record on the page c of the version 3→a record on the page c of another version (69, 63 and 64). When updating a transaction link, the database system may set a transaction identifier of the deleted record 2 to T3, and set an operation transaction pointer of the transaction identifier T3 such that the operation transaction pointer (68) of the T3 is used to point to a transaction identifier T2 of a previous operation (that is, an operation on the page c of a version 1, or the like).

In FIG. 6, a relatively thin sold-line arrow (67, 61 or 62) is used to represent a data page link, a relatively thick sold-line arrow (68, 65 or 66) is used to represent a transaction link, and a dashed-line arrow is used to represent a record link (69, 63 or 64).

(4) A write operation of updating a record is similar to the foregoing write operation of inserting a record. A difference is that when an operation is performed on a page according to a data writing operation request, a record on the page is changed to a record corresponding to the data writing operation request.

An embodiment of the present disclosure further provides a database system. A schematic structural diagram of the database system is shown in FIG. 7, including a read receiving unit 10 configured to receive a data reading request generated by a read transaction, where the data reading request is used to request to read a page in the database and the data reading request includes a timestamp of the read transaction, a reading unit 11 configured to read the current version page of the page that is requested to read by the data reading request if a timestamp of a current version page of the page that is requested to read by the data reading request received by the read receiving unit 10 is less than or equal to the timestamp of the read transaction, and a page-level rollback unit 12 configured to perform page-level rollback using a page pointer of the current version page in a data page link of the page that is requested to read by the request in order to roll back the current version page to a version page, a timestamp of which is less than or equal to the timestamp of the read transaction if the timestamp of the current version page is greater than the timestamp of the read transaction included in the data reading request received by the read receiving unit 10, where the data page link of the page that is requested to read includes a page pointer of each version page of the page that is requested to read, and the page pointer of each version page is used to point to another version page prior to a last operation on the version page, that is, a previous version page.

It can be seen that, a data page link of a page is set in the database, where the data page link includes a page pointer of each version page of the page, and a page pointer of a version page is used to point to another version page prior to a last operation on the version page, that is, a previous version page. When the database system in this embodiment reads a version page in the database, if a timestamp of a current version page is greater than a timestamp of a corresponding read transaction included in a data reading request, a page-level rollback unit 12 may directly perform page-level rollback according to a data page link of the page that is requested to read to roll back to a page that needs to be read, which helps a user to know a page in the database at any time, that is, which facilitates queries for data on each version page in the database.

Figure 7:
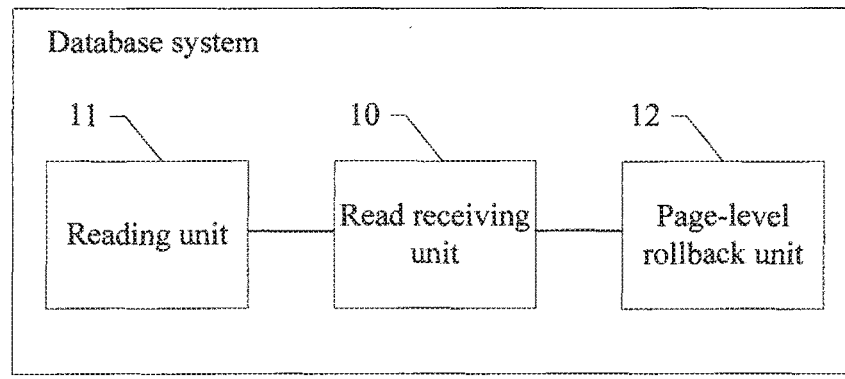
FIG. 7 is a schematic structural diagram of a database system according to an embodiment of the present disclosure.
Figure 8:
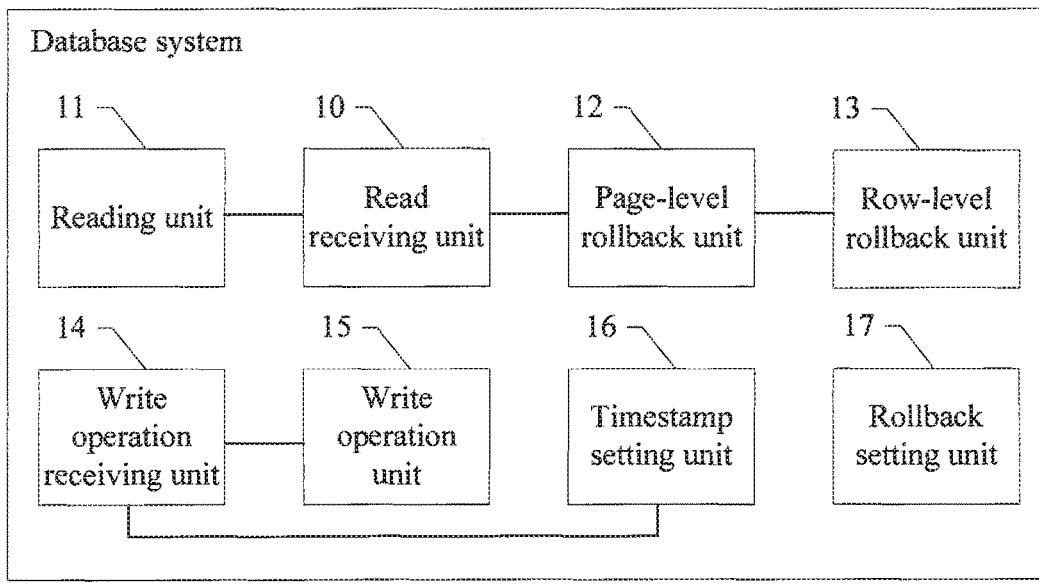
FIG. 8 is a schematic structural diagram of another database system according to an embodiment of the present disclosure.

As shown in FIG. 8, in a specific embodiment, in addition to the structure shown in FIG. 7, the database system may further include a row-level rollback unit 13, a write operation receiving unit 14, a write operation unit 15, a timestamp setting unit 16, and a rollback setting unit 17, where the row-level rollback unit 13 is configured to perform row-level rollback according to a record pointer of the one or more records included in a record link of the page that is requested to read in order to roll back the record in the operating state to a record prior to an operation, where the record link includes a record pointer of a record included in each version page of the page that is requested to read if one or more records on the version page obtained after the page-level rollback unit 12 performs the page-level rollback are in an operating state at a moment indicated by the timestamp of the version page obtained after the page-level rollback, and a record pointer of a record on a version page is used to point to another version record prior to a last operation on the version record, that is, a previous version record. The row-level rollback unit 13 may further perform the foregoing operation on the current version page read by the foregoing reading unit 11, that is, roll back a record in the operating state on the current version page to a record prior to an operation in order to realize consistent reading.

In this way, the row-level rollback unit 13 and the page-level rollback unit 12 in the database system may roll back, by combining the data page link and the record link, a record in an operating state on a version page obtained after page-level rollback to a record prior to modification such that the record rollback can be implemented efficiently by combining the data page link and the record link.

The write operation receiving unit 14 is configured to receive a data writing operation request generated by a write operation transaction, where the data writing operation request is used to request to perform a write operation on a page in the database and the data writing operation request includes a timestamp of the write operation transaction.

The write operation unit 15 is configured to read a first version page corresponding to the data writing operation request received by the write operation receiving unit 14, and perform the write operation on the first version page according to the data writing operation request received by the write operation receiving unit 14 to obtain a second version page, where the first version page is a latest version page of the page that is requested by the data writing operation request and stored in the database before the write operation is performed, and the second version page is a latest version page of the page that is requested by the data writing operation request and stored in the database after the write operation is performed.

The timestamp setting unit 16 is configured to set a timestamp of the second version page according to the timestamp of the write operation transaction included in the data writing operation request received by the write operation receiving unit 14. The timestamp setting unit 16 is further configured to use the timestamp of the first version page as the timestamp of the second version page if a timestamp of the first version page is greater than the timestamp of the write operation transaction in the data writing operation request received by the write operation receiving unit 14, and set the timestamp of the second version page to the timestamp of the write operation transaction in the data writing operation request received by the write operation receiving unit 14 if the timestamp of the first version page is less than the timestamp of the write operation transaction in the data writing operation request received by the write operation receiving unit 14.

Figure 9:
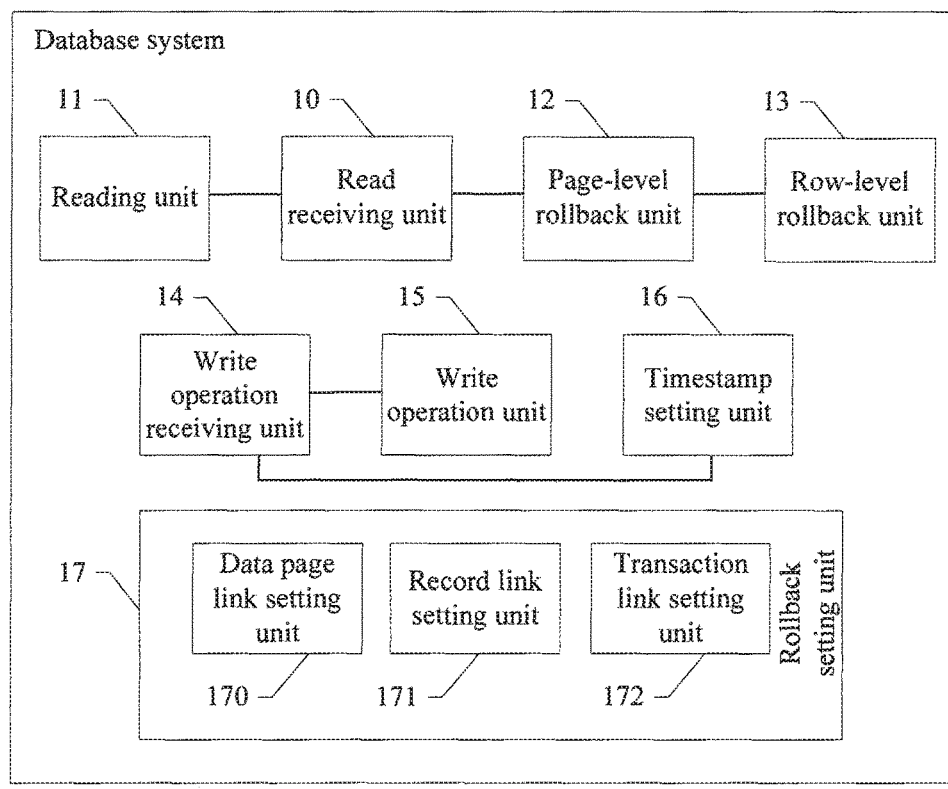
FIG. 9 is a schematic structural diagram of another database system according to an embodiment of the present disclosure.

The rollback setting unit 17 is configured to update a transaction link in the database such that the transaction link includes an operation transaction pointer of the write operation transaction, where the transaction link includes a plurality of operation transaction pointers of a record on the page in the database, and each operation transaction pointer is used to point to a previous operation transaction on the record on the page in the database, and set rollback information of the second version page, where the rollback information includes a page pointer and a record pointer. In a specific embodiment, as shown in FIG. 9, the rollback setting unit 17 may be further implemented by a data page link setting unit 170, a record link setting unit 171, and a transaction link setting unit 172.

In this embodiment, in the database system, the write operation on the database may include the following several manners.

(1) When the data writing operation request received by the write operation receiving unit 14 is a data writing operation request that requests to insert a record on the first version page, the write operation unit 15 is further configured to insert, on the first version page, the record that is requested to insert by the data writing operation request to obtain the second version page, and store the first version page and the second version page.

The data page link setting unit 170 in the rollback setting unit 17 is configured to set a page pointer of the second version page such that the page pointer of the second version page is used to point to the first version page. The record link setting unit 171 is configured to set a record pointer of the second version page such that a record pointer of the inserted record on the second version page is used to point to a rollback record corresponding to the inserted record, where the rollback record includes information that the inserted record has been deleted from the first version page, and when updating the transaction link in the database, the transaction link setting unit 172 sets a transaction identifier corresponding to the write operation transaction of inserting the record on the first version page, and sets an operation transaction pointer corresponding to the transaction identifier such that the operation transaction pointer is used to point to a transaction identifier of a previous operation of the write operation transaction of inserting the record on the first version page.

(2) When the data writing operation request received by the write operation receiving unit 14 is a data writing operation request that requests to delete a record from the first version page, the write operation unit 15 is further configured to mark, on the first version page, the record that is requested to delete by the data writing operation request as deleted to obtain the second version page, and store the first version page and the second version page.

The data page link setting unit 170 in the rollback setting unit 17 is further configured to set a page pointer of the second version page such that the page pointer of the second version page is used to point to the first version page. The record link setting unit 171 is further configured to set a record pointer of the second version page such that a record pointer of a record marked as deleted on the second version page is used to point to the record that is requested to delete by the data writing operation request from the first version page, and when updating the transaction link, the transaction link setting unit 172 may set a transaction identifier corresponding to the write operation transaction of deleting the record, and set an operation transaction pointer corresponding to the transaction identifier such that the operation transaction pointer is used to point to a transaction identifier of a previous operation of the write operation transaction of deleting the record.

(3) When the data writing operation request received by the write operation receiving unit 14 is a data writing operation request that requests to update a record on the first version page, the write operation unit 15 is further configured to update the corresponding record on the first version page according to an indication of the data writing operation request to obtain the second version page, and store the first version page and the second version page.

The data page link setting unit 170 in the rollback setting unit 17 is further configured to set a page pointer of the second version page such that the page pointer of the second version page is used to point to the first version page. The record link setting unit 171 is further configured to set a record pointer of the second version page such that a record pointer of an updated record on the second version page is used to point to the record prior to the update on the first version page, and when updating the transaction link, the transaction link setting unit 172 sets a transaction identifier corresponding to the write operation transaction of updating the record, and sets an operation transaction pointer corresponding to the transaction identifier such that the operation transaction pointer is used to point to a transaction identifier of a previous operation of the write operation transaction of updating the record.

Figure 10:
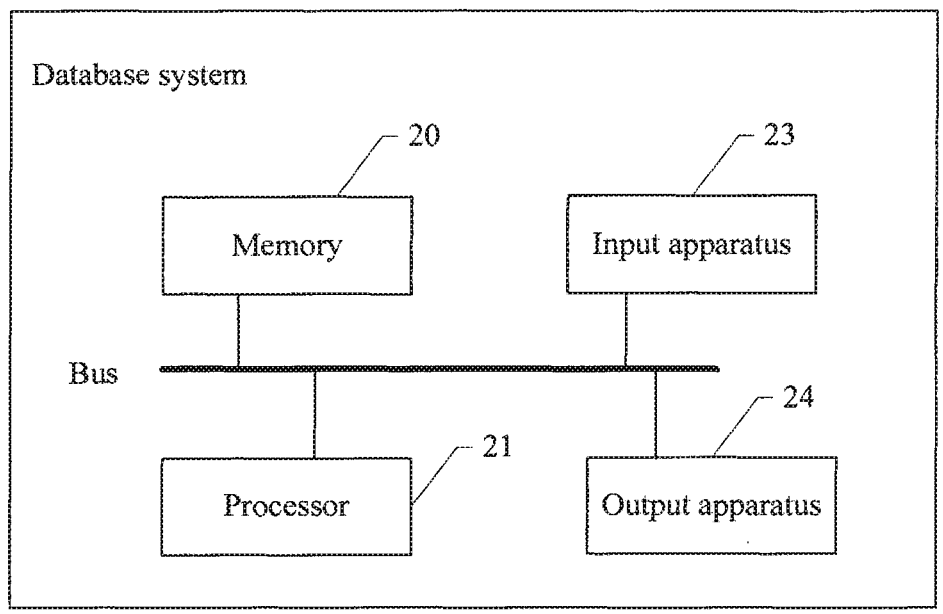
FIG. 10 is a schematic structural diagram of another database system according to an embodiment of the present disclosure.

An embodiment of the present disclosure further provides another database system. A schematic structural diagram of the database system is shown in FIG. 10, including a memory 20, a processor 21, an input apparatus 23, and an output apparatus 24 that are separately connected to a bus, where the memory 20 is configured to store data input by the input apparatus 23, and may further store information such as a necessary file used by the processor 21 to process data. In this embodiment, the memory 20 stores data in the form of a database, that is, a database is stored in the memory 20. In this embodiment, the input apparatus 23 and the output apparatus 24 include an external device of the database system, for example, a display, a keyboard, a mouse, and a printer, and may further include an interface for communication between the database and another device.

In the database system in this embodiment, the output apparatus 24 may output a user interface of the database system such that a user may perform a read operation on data in the database system using the user interface. When the user initiates a data reading transaction using the input apparatus 23, a data reading request is transmitted to the processor 21.

The processor 21 is configured to receive a data reading request generated by a read transaction, where the data reading request is used to request to read a page in the database, and the data reading request includes a timestamp of the read transaction, read the current version page of the page that is requested to read by the data reading request if a timestamp of a current version page of the page that is requested to read by the data reading request is less than or equal to the timestamp of the read transaction, and perform page-level rollback according to a page pointer of the current version page in a data page link of the page that is requested to read in order to roll back the current version page to a version page, a timestamp of which is less than or equal to the timestamp of the read transaction if the timestamp of the current version page is greater than the timestamp of the read transaction, where the data page link of the page that is requested to read includes a page pointer of each version page of the page that is requested to read, and the page pointer of each version page is used to point to another version page prior to a last operation on the version page, that is, a previous version page.

Further, after the processor 21 performs the page-level rollback, the processor 21 is further configured to perform row-level rollback according to a record pointer of the one or more records included in a record link of the page that is requested to read in order to roll back the record in the operating state to a record prior to an operation if one or more records on the version page obtained after the page-level rollback are in an operating state at a moment indicated by the timestamp of the version page obtained after the page-level rollback, where the record link includes a record pointer of a record included in each version page of the page that is requested to read, and a record pointer of a record on a version page is used to point to another version record prior to a last operation on the record, that is, a previous version record.

In this way, a data page link of a page is set in the database, where the data page link includes a page pointer of each version page of the page, and a page pointer of a version page is used to point to another version page prior to a last operation on the version page, that is, a previous version page. When the database system in this embodiment reads a page in the database, if a timestamp of a current version page is greater than a timestamp of a read transaction included in a data reading request, the processor 21 may directly perform page-level rollback according to a data page link of the page that is requested to read to roll back to a version page that needs to be read, which helps a user to know a page in the database at any time, that is, which facilitates queries for data on each version page in the database. In addition, the processor 21 may roll back, in combination with a record link, a record in an operating state on the version page obtained after the page-level rollback to a record prior to modification such that the record rollback can be implemented efficiently by combining the data page link and the record link, thereby realizing consistent reading.

In a specific embodiment, the user may perform a write operation on data in the database using the user interface of the database system, which is output by the output apparatus 24. When the user initiates a data writing transaction using the input apparatus 23, a data writing operation request is transmitted to the processor 21. In this case, the processor 21 is further configured to perform a write operation on a page in the database. The processor 21 receives a data writing operation request generated by a write operation transaction, where the data writing operation request is used to request to perform a write operation on a first version page in the database, and the data writing operation request includes a timestamp of the write operation transaction, reads the first version page corresponding to the data writing operation request, and performs the write operation on the first version page according to the data writing operation request to obtain a second version page, sets a timestamp of the second version page according to the timestamp of the write operation transaction, updates a transaction link in the database such that the transaction link includes an operation transaction pointer of the write operation transaction, where the transaction link includes a plurality of operation transaction pointers of a record on the page in the database, and each operation transaction pointer is used to point to a previous operation transaction on the record on the page in the database, and sets rollback information of the second version page, where the rollback information includes a page pointer and a record pointer. The first version page is a latest version page of the page that is requested by the data writing operation request and stored in the database before the write operation is performed, and the second version page is a latest version page of the page that is requested by the data writing operation request and stored in the database after the write operation is performed.

In addition, when setting the timestamp of the second version page, the processor 21 is further configured to use the timestamp of the first version page as the timestamp of the second version page if a timestamp of the first version page is greater than the timestamp of the write operation transaction, and set the timestamp of the second version page to the timestamp of the write operation transaction in the data writing operation request if the timestamp of the first version page is less than the timestamp of the write operation transaction.

In a specific implementation process, the write operation performed by the processor 21 in the database system on the database may include the following several manners.

(1) When the data writing operation request received by the processor 21 is a data writing operation request that requests to insert a record on the first version page, the processor 21 is further configured to insert, on the first version page, the record that is requested to insert by the data writing operation request to obtain the second version page, and store the first version page and the second version page, set a page pointer of the second version page such that the page pointer of the second version page is used to point to the first version page, set a record pointer of the second version page such that a record pointer of the inserted record on the second version page is used to point to a rollback record corresponding to the inserted record, where the rollback record includes information that the record that is requested to insert by the data writing operation request has been deleted from the first version page, and set a transaction identifier corresponding to the write operation transaction of inserting the record on the first page when updating the transaction link, and set an operation transaction pointer corresponding to the transaction identifier such that the operation transaction pointer is used to point to a transaction identifier of a previous operation of the write operation transaction of inserting the record on the first version page.

(2) When the data writing operation request received by the processor 21 is a data writing operation request that requests to delete a record from the first version page, the processor 21 is further configured to mark, on the first version page, the record that is requested to delete by the data writing operation request as deleted to obtain the second version page, and store the first version page and the second version page, set a page pointer of the second version page such that the page pointer of the second version page is used to point to the first version page, set a record pointer of the second version page such that a record pointer of a record marked as deleted on the second version page is used to point to the record that is requested to delete by the data writing operation request from the first version page, and set a transaction identifier corresponding to the write operation transaction of deleting the record when updating the transaction link, and set an operation transaction pointer corresponding to the transaction identifier such that the operation transaction pointer is used to point to a transaction identifier of a previous operation of the write operation transaction of deleting the record.

(3) When the data writing operation request received by the processor 21 is a data writing operation request that requests to update a record on the first version page, the processor 21 is further configured to update the corresponding record on the first version page according to an indication of the data writing operation request to obtain the second version page, and store the first version page and the second version page, set a page pointer of the second version page such that the page pointer of the second version page is used to point to the first version page, set a record pointer of the second version page such that a record pointer of an updated record on the second version page is used to point to the record prior to the update on the first version page, and set a transaction identifier corresponding to the write operation transaction of updating the record when updating the transaction link, and set an operation transaction pointer corresponding to the transaction identifier such that the operation transaction pointer is used to point to a transaction identifier of a previous operation of the write operation transaction of updating the record on the first version page.

A person of ordinary skill in the art may understand that all or a part of the steps of the methods in the embodiments may be implemented by a program instructing related hardware. The program may be stored in a computer-readable storage medium. The storage medium may include a read-only memory (ROM), a random access memory (RAM), a magnetic disk, or an optical disc.

What has been described in detail is an MVCC method in a database and a database system provided by the embodiments of the present disclosure. Specific examples are used in this specification to describe the principle and implementation manners of the present disclosure. The descriptions of the foregoing embodiments are merely intended to help understand the method and core idea of the present disclosure. In addition, a person skilled in the art may, according to the idea of the present disclosure, make modifications with respect to the specific implementation manners and the application scope. Therefore, the content of this specification shall not be construed as a limitation on the present disclosure.

What is claimed is:

1. A multi-version concurrency control method in a database, wherein the database comprises a current page and a previous page, wherein the previous page is a previous version of the current page, wherein the current page comprises a current record and the previous page comprising a previous record, wherein the previous record is a previous version of the current record, and wherein the method comprises:
    creating a data page link, a record link and a transaction link for the current page in the database, wherein the data page link comprises a page pointer which points to the previous page, wherein the record link comprises a record pointer which points to the previous record, wherein the transaction link comprises a plurality of operation transaction pointers of the current record, and wherein each operation transaction pointer is used to point to a previous operation transaction on the current record;
    receiving a data writing operation request generated by a write operation transaction, wherein the data writing operation request is used to request to perform a write operation, and wherein the data writing operation request comprises a timestamp of the write operation transaction;
    performing the write operation on the current page, which is a latest version before the write operation is performed, according to the data writing operation request to obtain a new page;
    setting a timestamp of the new page according to the timestamp of the write operation transaction;
    creating a new transaction link in new page such that the new transaction link comprises a new operation transaction pointer, wherein the new operation transaction pointer is used to point to the write operation transaction; and
    setting rollback information of the new page, wherein the rollback information comprises a new page pointer which points to the current page and a new record pointer.

2. The method according to claim 1, wherein performing the write operation on the current page according to the data writing operation request to obtain the new page comprises:
    inserting, on the current page, a record that is requested to be inserted by the data writing operation request to obtain the new page and storing the current page and the new page
    wherein setting the rollback information of the new page comprises:
        setting the new page pointer of the new page such that the new page pointer of the new page is used to point to the current page; and
    setting the new record pointer of the new page to point to the current record, wherein the record that is requested to insert by the data writing operation request has been deleted from the current page, and
    wherein updating the transaction link of the database comprises:
    setting a transaction identifier of the write operation transaction of inserting the record on the current page; and
    setting a second operation transaction pointer corresponding to the transaction identifier such that the second operation transaction pointer is used to point to a transaction identifier of a previous operation of the write operation transaction of inserting the record on the current page.

3. The method according to claim 1, wherein performing the write operation on the current page according to the data writing operation request to obtain the new page comprises:
    marking, on the current page, a record that is requested to be deleted by the data writing operation request as deleted to obtain the new page when the data writing operation request requests to delete the record; and
    storing the current page and the new page, wherein setting the rollback information of the new page comprises:
    setting the new page pointer of the new page such that the new page pointer of the new page is used to point to the current page; and
    setting the new record pointer of the new page such that the new record pointer of the record marked as deleted on the new page is used to point to the record that is requested to delete by the data writing operation request from the current page, and
    wherein updating the transaction link of the database further comprises:
    setting a transaction identifier corresponding to the write operation transaction of deleting the record; and
    setting a second operation transaction pointer corresponding to the transaction identifier such that the second operation transaction pointer points to a transaction identifier of a previous operation of the write operation transaction of deleting the record.

4. The method according to claim 1, wherein performing the write operation on the current page according to the data writing operation request to obtain the new page comprises:
    updating a record on the current page according to an indication of the data writing operation request to obtain the new page when the data writing operation request requests to update the record; and storing the current page and the new page,
    wherein setting the timestamp of the new page according to the timestamp of the write operation transaction comprises setting the timestamp of the new page to the timestamp of the write operation transaction,
    wherein setting the rollback information of the new page comprises:
        setting the new page pointer of the new page such that the new page pointer of the new page is used to point to the current page; and setting the new record pointer of the new page such that the new record pointer of the updated record on the new page is used to point to the record prior to the update on the current page, and wherein updating the transaction link of the database comprises:

setting a transaction identifier corresponding to the write operation transaction of updating the record; and setting a second operation transaction pointer corresponding to the transaction identifier such that the second operation transaction pointer is used to point to a transaction identifier of a previous operation of the write operation transaction of updating the record.

5. The method according to claim 1, wherein setting the timestamp of the new page according to the timestamp of the write operation transaction comprises:

using a timestamp of the current page as the timestamp of the new page when the timestamp of the current page is greater than the timestamp of the write operation transaction; and setting the timestamp of the new page to the timestamp of the write operation transaction when the timestamp of the current page is less than the timestamp of the write operation transaction.

6. A database system having a database, comprising:

a memory storing a current page and a previous page, wherein the previous page is a previous version of the current page, wherein the current page comprises a current record and the previous page comprises a previous record, and wherein the previous record is a previous version of the current record; and a processor coupled to the memory and configured to:

create a data page link, a record link and a transaction link for the current page in the database, wherein the data page link comprises a page pointer which points to the previous page, wherein the record link comprises a record pointer which points to the previous record, and wherein the transaction link comprises a plurality of operation transaction pointers of the current record, and wherein each operation transaction pointer is used to point to a previous operation transaction on the current record;

receive a data writing operation request generated by a write operation transaction, wherein the data writing operation request is used to request to perform a write operation, and wherein the data writing operation request comprises a timestamp of the write operation transaction;

perform the write operation on the current page, which is a latest version before the write operation is performed, according to the data writing operation request to obtain a new page;

set a timestamp of the new page according to the timestamp of the write operation transaction;

creating a new transaction link such that the new transaction link comprises a new operation transaction pointer, wherein the new operation transaction pointer is used to point to the write operation transaction; and set rollback information of the new page, wherein the rollback information comprises a new page pointer which points to the current page and a new record pointer.

7. The database system according to claim 6, wherein the processor is further configured to:

insert, on the current page, a record that is requested to insert by the data writing operation request to obtain the new page when the data writing operation request received requests to insert the record on the first version page;

store the current page and the new page;

set the new page pointer of the new page such that the new page pointer of the new page is used to point to the current page;

set the new record pointer of the new page to point the current record, wherein the record that is requested to insert by the data writing operation request has been deleted from the current page;

set a transaction identifier of the write operation transaction of inserting the record on the current page; and set a second operation transaction pointer corresponding to the transaction identifier such that the second operation transaction pointer is used to point to a transaction identifier of a previous operation of the write operation transaction of inserting the record on the current page.

8. The database system according to claim 6, wherein the processor is further configured to:

mark, on the current page, a record that is requested to delete by the data writing operation request as deleted to obtain the new page when the data writing operation request requests to delete the record from the current page; and store the current page and the new page;

set the new page pointer of the new page such that the new page pointer of the new page is used to point to the current page;

set the new record pointer of the new page such that the new record pointer of the record marked as deleted on the new page is used to point to the record that is requested to delete by the data writing operation request from the current page;

set another transaction identifier corresponding to the write operation transaction of deleting the record; and set a second operation transaction pointer corresponding to the transaction identifier such that the second operation transaction pointer is used to point to a transaction identifier of a previous operation of the write operation transaction of deleting the record.

9. The database system according to claim 6, wherein the processor is further configured to:

update a record on the current page according to an indication of the data writing operation request to obtain the new page;

store the current page and the new page when the data writing operation request received requests to update the record on the current page;

set the new page pointer of the new page such that the new page pointer of the new page is used to point to the current page;

set new record pointer of the new page such that the new record pointer of an updated record on the new page is used to point to the record prior to the update on the current page;

set another transaction identifier corresponding to the write operation transaction of updating the record; and set a second operation transaction pointer corresponding to the another transaction identifier such that the second operation transaction pointer is used to point to a transaction identifier of a previous operation of the write operation transaction of updating the record.

10. The database system according to claim 6, wherein the processor is further configured to:

use a timestamp of the current page as the timestamp of the new page when the timestamp of the current page is greater than the timestamp of the write operation transaction; and set the timestamp of the new page to the timestamp of the write operation transaction when the timestamp of the current page is less than the timestamp of the write operation transaction.

\* \* \* \* \*